United States Patent
Maeda (10) Patent No.: US 7,924,675 B2
(45) Date of Patent: Apr. 12, 2011

(54) INFORMATION RECORDING APPARATUS, IMAGING DEVICE, INFORMATION-RECORDING CONTROLLING METHOD, AND COMPUTER PROGRAM

(75) Inventor: Tetsuhiro Maeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1154 days.

(21) Appl. No.: 11/525,823

(22) Filed: Sep. 25, 2006

(65) Prior Publication Data

US 2007/0081430 A1    Apr. 12, 2007

(30) Foreign Application Priority Data

Oct. 6, 2005  (JP) .................. 2005-293194

(51) Int. Cl.
*G11B 20/12* (2006.01)
(52) U.S. Cl. ............... 369/59.25; 369/30.23; 369/44.26; 369/275.3
(58) Field of Classification Search .................. None
See application file for complete search history.

(56) References Cited

U.S. PATENT DOCUMENTS

| | | | | |
|---|---|---|---|---|
| 6,172,955 B1 * | 1/2001 | Hashimoto | ................ | 369/53.37 |
| 7,274,637 B2 * | 9/2007 | Sasaki | ................ | 369/47.33 |

FOREIGN PATENT DOCUMENTS

| | | | |
|---|---|---|---|
| JP | 8-147110 | | 6/1996 |
| JP | 2001-76421 | | 3/2001 |
| JP | 2001076421 A | * | 3/2001 |
| JP | 3474110 | | 9/2003 |
| JP | 2004-164809 | | 6/2004 |
| JP | 3595551 | | 9/2004 |
| JP | 3617631 | | 11/2004 |
| JP | 3617632 | | 11/2004 |
| JP | 2005-38591 | | 2/2005 |
| JP | 3652675 | | 3/2005 |

* cited by examiner

*Primary Examiner* — Joseph Haley
*Assistant Examiner* — Ifedayo Iluyomade
(74) *Attorney, Agent, or Firm* — Oblon, Spivak, McClelland, Maier & Neustadt, L.L.P.

(57) ABSTRACT

An information recording apparatus for recording data on an information recording medium includes a logical-format-image manager configured to generate logical-format-image data; a logical-format-image storage unit configured to store the logical-format-image data generated by the logical-format-image manager; and a recording controller configured to exercise control so that the logical-format-image data stored in the logical-format-image storage unit is recorded on an information recording medium during periods of suspension of recording of user data on the information recording medium, the periods of suspension being provided intermittently on the basis of an amount of user data stored in a buffer for storing user data.

20 Claims, 8 Drawing Sheets

INFORMATION RECORDING APPARATUS, IMAGING DEVICE, INFORMATION-RECORDING CONTROLLING METHOD, AND COMPUTER PROGRAM

CROSS REFERENCES TO RELATED APPLICATIONS

The present invention contains subject matter related to Japanese Patent Application JP 2005-293194 filed in the Japanese Patent Office on Oct. 6, 2005, the entire contents of which are incorporated herein by reference.

BACKGROUND OF THE INVENTION

1. Field of the Invention

The present invention relates to information recording apparatuses, imaging devices, information-recording controlling methods, and computer programs. More specifically, the present invention relates to an information recording apparatus, an imaging device, an information-recording controlling method, and a computer program for avoiding processing delay associated with formatting when information is recorded on an information recording medium, such as a digital versatile disc (DVD), so that data can be recorded quickly.

2. Description of the Related Art

When video data or other types of information is recorded on an information recording medium, such as a DVD, formatting is to be executed according to a predetermined standard. For example, specific application-format data and file-system data defined by a standardization organization, such as the DVD Forum or the DVD+RW Alliance, are set and recorded.

For example, when video data is recorded on an information recording medium such as a DVD, generally, before recording the data, the following steps are taken:
(a) Physical formatting of the information recording medium; and
(b) Generation and recording of logical-format data.

Furthermore, depending on the type of recording medium, in addition to the physical formatting and the recording of logical-format data, for example, another step is taken to record dummy data in an area in which data has not yet been recorded, i.e.;
(c) Formatting of individual blocks.

These steps of formatting, executed for initialization of a recording medium, take a rather long time. Thus, for example, when video data is recorded by a video camera or the like, the user could unfortunately miss a desired scene while waiting for completion of initialization.

Techniques for solving the problem of delay of start of recording due to initialization have been proposed, for example, in Japanese Unexamined Patent Application Publication No. 2005-38570 (Japanese Patent No. 3595551). This document proposes an improved method of what is called back ground formatting, in which, among the steps of initialization listed above, (c) Formatting of individual blocks is executed in the background while processing for recording data is being executed. According to this method, however, the period of (b) Generation and recording of logical-format data still remains. During this period, it is not allowed to start recording of user data, such as captured video data, so that the user just waits for completion of this step.

As another example, according to a formatting method proposed in Japanese Unexamined Patent Application Publication No. 2003-162868 (Japanese Patent No. 3652675), (b) Generation and recording of logical-format data and (c) Formatting of individual blocks are not particularly distinguished from each other, and recording of packet data executed as these steps of recording format data are executed in the background while processing for recording user data is being executed.

According to this method, however, writing to a recording medium occurs before completion of formatting when a request for recording user data is not issued. Thus, for example, in the case of a portable video-data recording apparatus, such as a video camera, format data is recorded even when, for example, the user is carrying the video camera instead of recording video data. In this case, a write error of format data could occur and formatting could fail due to vibration or other factors. This could result in corruption of data; for example, appropriate recording or playback of user data on the recording medium could fail.

SUMMARY OF THE INVENTION

It is desired that an information recording apparatus, an imaging device, an information-recording controlling method, and a computer program be provided that allow avoiding processing delay associated with formatting when information is recorded on an information recording medium, such as a DVD, so that data can be recorded quickly.

More specifically, it is desired that an information recording apparatus, an imaging device, an information-recording controlling method, and a computer program be provided with which, during initialization, it is possible to construct logical-format data, such as application-format data and file-system data, on a memory in an information recording apparatus without recording the logical-format data on a recording medium, and to write the logical-format data constructed on the memory to a recording medium during intermittent intervals of recording of user data while user data is being processed. This allows starting recording of user data without waiting for completion of initialization, so that it is possible to record user data, such as video data, even when the logical-format data has not been recorded on the information recording medium.

According to an embodiment of the present invention, there is provided an information recording apparatus for recording data on an information recording medium. The information recording apparatus includes logical-format-image managing means for generating logical-format-image data; logical-format-image storing means for storing the logical-format-image data generated by the logical-format-image managing means; and recording controlling means for exercising control so that the logical-format-image data stored in the logical-format-image storing means is recorded on an information recording medium during periods of suspension of recording of user data on the information recording medium, the periods of suspension being provided intermittently on the basis of an amount of user data stored in a buffer for storing user data.

The information recording apparatus may further include amount-of-storage managing means for monitoring the amount of user data stored in the buffer for storing user data. In this case, the recording controlling means is configured to exercise control so that the user data stored in the buffer is recorded on the information recording medium on condition that the amount of user data stored in the buffer, monitored by the amount-of-storage managing means, has become greater than or equal to a predetermined overflow checking threshold, and so that the logical-format-image data stored in the logical-format-image storing means is recorded on the information recording medium on condition that the amount of user data stored in the buffer has become less than or equal to a predetermined underflow checking threshold.

In the information recording apparatus, the recording controlling means may be configured to exercise control so that recording of the logical-format-image data stored in the logical-format-image storing means on the information recording medium is suspended on condition that the amount of user data stored in the buffer, monitored by the amount-of-storage managing means, has become greater than or equal to a predetermined threshold for inhibiting recording of logical-format-image packets and less than the overflow checking threshold.

Also, in the information recording apparatus, the logical-format-image managing means may be configured to generate packets containing segments of the logical-format-image data, the segments individually corresponding to units of data recording on the information recording medium, and to store the packets in the logical-format-image storing means as a packet list in which the packets are linked by pointers, and the recording controlling means may be configured to obtain the packets containing the segments of the logical-format-image data stored in the logical-format-image storing means and to record the packets on the information recording medium, in an order according to the list.

Also, in the information recording apparatus, the logical-format-image managing means may be configured to generate the logical-format-image data on the basis of format data of either an application format or a filesystem format or both an application format and a filesystem format.

Also, in the information recording apparatus, the recording controlling means may be configured to refer to a mirror-surface-state management bitmap provided as information representing areas in which data has not yet been recorded on the information recording medium, and to exercise control to pad an area in which data has not yet been recorded and that is to be padded to allow recording of the logical-format-image data on the information recording medium.

Also, in the information recording apparatus, the recording controlling means may be configured to exercise control so that, when an instruction for power off of the information recording apparatus or for ejection of the information recording medium is input before completion of recording of the logical-format-image data on the information recording medium, the logical-format-image data is recorded on the information recording medium and power off of the information recording apparatus or ejection of the information recording medium is allowed after completion of recording of the logical-format-image data.

Also, in the information recording apparatus, the recording controlling means may be configured to allow input of user data after completion of physical formatting when the information recording medium requires physical formatting, and to allow input of user data before start of recording of the logical-format-image data on the information recording medium regardless of whether physical formatting is executed when the information recording medium does not require physical formatting.

According to another embodiment of the present invention, there is provided an imaging device for recording captured image data on an information recording medium. The imaging device includes a data input unit configured to receive input of user data obtained by imaging; a buffer configured to store the user data input via the data input unit; logical-format-image managing means for generating logical-format-image data; logical-format-image storing means for storing the logical-format-image data generated by the logical-format-image managing means; and recording controlling means for exercising control so that the logical-format-image data stored in the logical-format-image storing means is recorded on an information recording medium during periods of suspension of recording of user data on the information recording medium, the periods of suspension being provided intermittently on the basis of an amount of user data stored in the buffer for storing user data.

According to another embodiment of the present invention, there is provided an information-recording controlling method for recording data on an information recording medium. The information-recording controlling method includes the steps of generating logical-format-image data; storing the generated logical-format-image data in logical-format-image storing means; and exercising control so that the logical-format-image data stored in the logical-format-image storing means is recorded on an information recording medium during periods of suspension of recording of user data on the information recording medium, the periods of suspension being provided intermittently on the basis of an amount of user data stored in a buffer for storing user data.

The information-recording controlling method may further include the step of monitoring the amount of user data stored in the buffer for storing user data. In this case, when exercising control, control is exercised so that the user data stored in the buffer is recorded on the information recording medium on condition that the amount of user data stored in the buffer, detected by the monitoring, has become greater than or equal to a predetermined overflow checking threshold, and so that the logical-format-image data stored in the logical-format-image storing means is recorded on the information recording medium on condition that the amount of user data stored in the buffer has become less than or equal to a predetermined underflow checking threshold.

In the information-recording controlling method, when exercising control, control may be exercised so that recording of the logical-format-image data stored in the logical-format-image storing means on the information recording medium is suspended on condition that the amount of user data stored in the buffer, detected by the monitoring, has become greater than or equal to a predetermined threshold for inhibiting recording of logical-format-image packets and less than the overflow checking threshold.

Also, in the information-recording controlling method, after generating the logical-format-image data, packets containing segments of the logical-format-image data may be generated, the segments individually corresponding to units of data recording on the information recording medium, and the packets may be stored in the logical-format-image storing means as a packet list in which the packets are linked by pointers. Furthermore, when exercising control, control may be exercised to obtain the packets containing the segments of the logical-format-image data stored in the logical-format-image storing means and to record the packets on the information recording medium, in an order according to the list.

Also, in the information-recording controlling method, when generating the logical-format-image data, the logical-format-image data may be generated on the basis of format data of either an application format or a filesystem format or both an application format and a filesystem format.

The information-recording controlling method may further include the step of referring to a mirror-surface-state management bitmap provided as information representing areas in which data has not yet been recorded on the information recording medium, and exercising control to pad an area in which data has not yet been recorded and that is to be padded to allow recording of the logical-format-image data on the information recording medium.

Also, the information-recording controlling method may further include the step of exercising control so that, when an instruction for power off of the information recording apparatus or for ejection of the information recording medium is input before completion of recording of the logical-format-image data on the information recording medium, the logical-format-image data is recorded on the information recording medium and power off of the information recording apparatus or ejection of the information recording medium is allowed after completion of recording of the logical-format-image data.

Also, the information-recording controlling method may further include the step of exercising control to allow input of user data after completion of physical formatting when the information recording medium requires physical formatting, and to allow input of user data before start of recording of the logical-format-image data on the information recording medium regardless of whether physical formatting is executed when the information recording medium does not require physical formatting.

According to another embodiment of the present invention, there is provided a computer program for allowing an information recording apparatus to control recording of data on an information recording medium. The computer program includes the steps of generating logical-format-image data; storing the generated logical-format-image data in logical-format-image storing means; and exercising control so that the logical-format-image data stored in the logical-format-image storing means is recorded on an information recording medium during periods of suspension of recording of user data on the information recording medium, the periods of suspension being provided intermittently on the basis of an amount of user data stored in a buffer for storing user data.

The computer program according to the embodiment can be provided, for example, to a general-purpose computer system that is capable of executing various program codes, via a storage medium or a communication medium that provides the program in a computer-readable form, for example, a storage medium such as a CD, an FD, or an MO, or a communication medium such as a network. By providing the program in a computer-readable form, processing can be executed on the computer system in accordance with the program.

Further objects, features, and advantages of the present invention will become apparent from detailed description of embodiments with reference to the accompanying drawings. A system in this specification refers to a logical combination of a plurality of apparatuses, and is not limited to one in which constituent apparatuses are disposed within the same case.

According to embodiments of the present invention, logical-format-image data is written to an information recording medium during periods in which user data is being input but recording on the information recording medium is suspended. Thus, without waiting for completion of writing of the logical-format-image data to start recording of user data, for example, it is possible to immediately start imaging by a video camera. More specifically, in response to a request by a user for formatting a recording medium, the user is notified of completion when physical formatting has been completed, so that the user can start a next operation (e.g., start recording) without waiting for completion of logical formatting.

Furthermore, according to embodiments of the present invention, the logical-format-image data is written during a period in which user data is being input, e.g., while the user is carrying out imaging. During this period, for example, in the case of a portable device, the device is in a stable statue, and in contrast to a period during movement, the device will not be handled violently, so that data can be written stably to an information recording medium. Thus, the logical-format-image data can also be written stably, so that the possibility of occurrence of a writing error or the like can be reduced.

DESCRIPTION OF THE PREFERRED EMBODIMENTS

Now, an information recording apparatus, an imaging device, an information-recording controlling method, and a computer program according to embodiments of the present invention will be described in detail with reference to the drawings.

Figure 1:
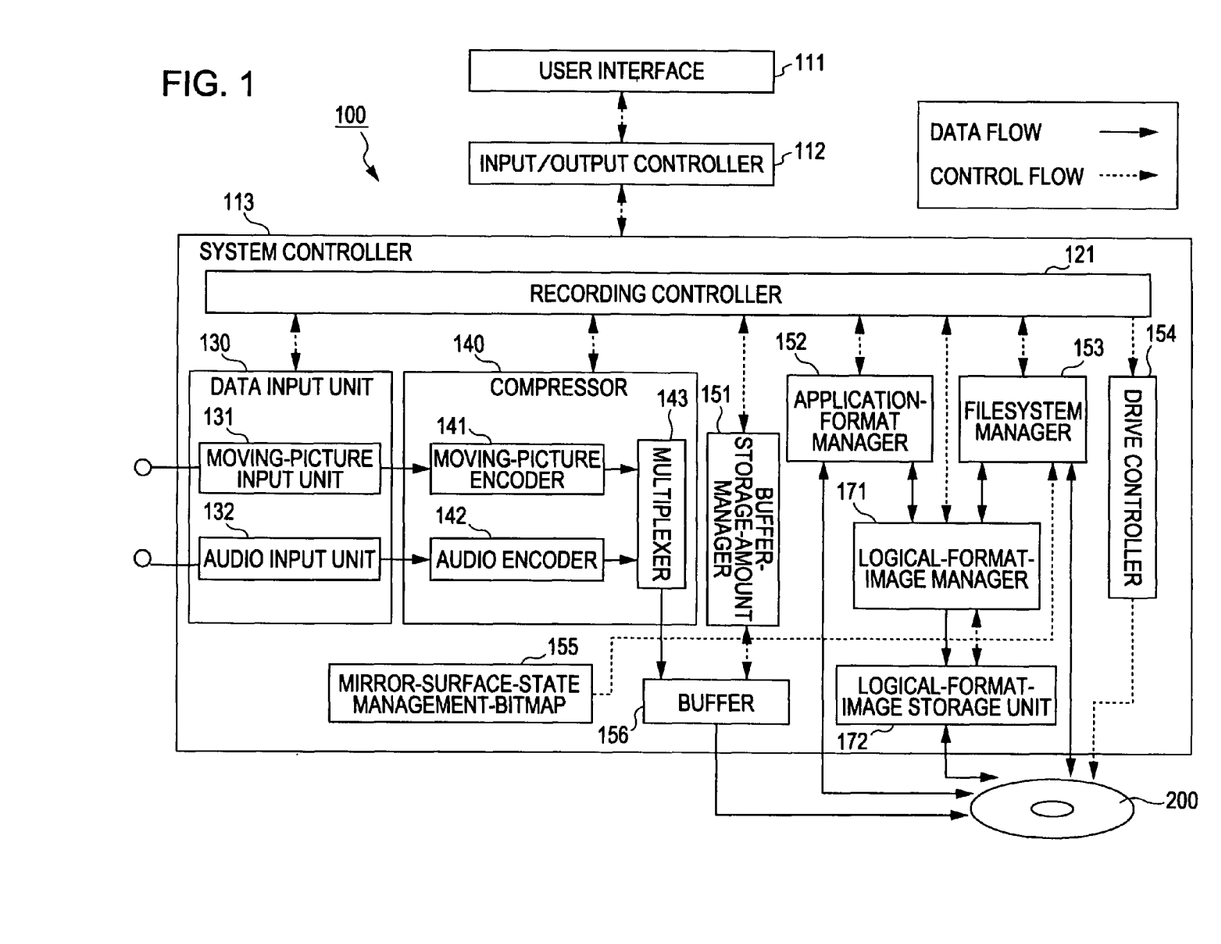
FIG. 1 is a block diagram showing the configuration of an information recording apparatus according to an embodiment of the present invention.

First, the configuration of an information recording apparatus according to an embodiment of the present invention will be described with reference to FIG. 1. Referring to FIG. 1, an information recording apparatus 100 is, for example, an imaging device such as a video camera, and the information recording apparatus 100 records information on an information recording medium 200 that allows recording information thereon. The information recording medium 200 is a medium that allows recording data thereon, such as a DVD.

The information recording apparatus 100 includes a user interface 111, an input/output controller 112, and a system controller 113. The user interface 111 accepts requests from a user, such as a request for start of recording, a request for end of recording, or a request for ejecting, and outputs instructions corresponding to the requests to the system controller 113 via the input/output controller 112.

The system controller 113 shown in FIG. 1 receives input of various instructions from the user interface 111, and controls the operation of the system as a whole by controlling various processors and other units according to the input instructions.

A recording controller 121 shown in FIG. 1 receives input of various types of information from a data input unit 130, a compressor 140, a buffer-storage-amount manager 151, an application-format manager 152, and a filesystem manager 153, controls a recording operation sequence on the basis of the input information, and outputs control information to the data input unit 130, the compressor 140, the buffer-storage-amount manager 151, the application-format manager 152, the filesystem manager 153, and a drive controller 154.

The data input unit 130 shown in FIG. 1 includes a moving-picture input unit 131 and an audio input unit 132. Under the control of the recording controller 121, the data input unit 130 receives moving-picture and audio signals input via an imager and a microphone or the like (not shown) or signals input from other external devices, and converts the signals into digital signals. The resulting digital moving-picture signals and digital audio signals are output to the compressor 140.

The compressor 140 includes a moving-picture encoder 141, an audio encoder 142, and a multiplexer 143. In the compressor 140, under the control of the recording controller 121, the moving-picture encoder 141 and the audio encoder 142 encode (compress) the moving-picture data and audio data supplied from the data input unit 130, and the multiplexer 143 multiplexes the encoded moving-picture data and audio data and outputs the multiplexed data as video data to a buffer 156.

The buffer-storage-amount manager 151 monitors the amount of data stored in the buffer 156, and controls the amount of data input from the compressor 140 and the amount of data output to the information recording medium 200 via the recording controller 121 so that the buffer 156 will not overflow or underflow.

The application-format manager 152, under the control of the recording controller 121, generates and analyzes application-format data that is used when data is recorded on the information recording medium 200, and carries out input/output of the application-format data with a logical-format-image storage unit 172 or the information recording medium 200.

The filesystem manager 153, under the control of the recording controller 121, generates and analyzes filesystem data that is used when data is recorded on the information recording medium 200, and carries out data input/output of the filesystem data with the logical-format-image storage unit 172 or the information recording medium 200. Also, the filesystem manager 153 controls the drive controller 154 via the recording controller 121 to record user data stored in the buffer 156 on the information recording medium 200. At the time of recording, the recording position is controlled so that the user data is output to an appropriate position.

A logical-format-image manager 171 processes initial data images respectively output from the filesystem manager 153 and the application-format manager 152, according to a method proposed in this embodiment, and outputs the results to the logical-format-image storage unit 172. Also, the logical-format-image manager 171 controls the drive controller 154 via the recording controller 121 to output data stored in the logical-format-image storage unit 172 to the information recording medium 200 at specific timings. The timings of outputting the data stored in the logical-format-image storage unit 172 to the information recording medium 200 will be described later in detail.

The drive controller 154 controls the information recording medium 200 as appropriate when data is read from or written to the information recording medium 200, on the basis of control information supplied from the recording controller 121.

Each of the buffer 156 and the logical-format-image storage unit 172 may be a non-volatile memory or a volatile memory.

A mirror-surface-state management bitmap 155 is used when the information recording medium 200 is an optical recording medium, such as a DVD, to manage mirror-surface-state areas in which data has not yet been recorded. A bit map is stored in a storage unit, in which each bit is associated with a certain recording unit that depends on the type of information recording medium (e.g., an ECC block in the case of a DVD), thereby allowing distinction between areas where data has already been recorded and areas where data has not yet been recorded on an optical recording medium, such as a DVD. The status of data recording on the information recording medium 200 is managed on the basis of the bitmap.

Next, a sequence of a process of formatting the information recording medium 200, executed by the information recording apparatus 100 shown in FIG. 1, will be described. When a formatting request has been input by the user via an input unit of the user interface 111, the formatting request is input to the system controller 113 via the input/output controller 112.

When the formatting request has been input to the system controller 113, the recording controller 121 executes physical formatting of the information recording medium 200 via the drive controller 154. Physical formatting is not needed in some cases, for example, in the case of a recording medium that has already been physically formatted or depending on the type of recording medium. In such cases, physical formatting is skipped.

Then, the recording controller 121 issues a logical formatting request to the application-format manager 152 and the filesystem manager 153. The application-format manager 152 and the filesystem manager 153 construct an initial data image of application-format data and an initial data image of filesystem-format data used for recording data on the information recording medium 200, in accordance with an application format or a file system format specified by the user, and outputs the initial data image of application-format data and the initial data image of filesystem-format data to the logical-format-image manager 171.

Hereinafter, the application-format data and the filesystem-format data will be collectively referred to as logical-format data, and an initial data image of the logical-format data will be referred to as a logical-format image.

The logical-format-image manager 171 processes the logical-format image according to a method proposed below, and outputs the processed logical-format image to the logical-format-image storage unit 172, so that the processed logical-format image is stored in the logical-format-image storage unit 172.

The logical-format image generated by the logical-format-image manager 171 and stored in the logical-format-image storage unit 172 will be described with reference to FIGS. 2A and 2B.

Figure 2A:
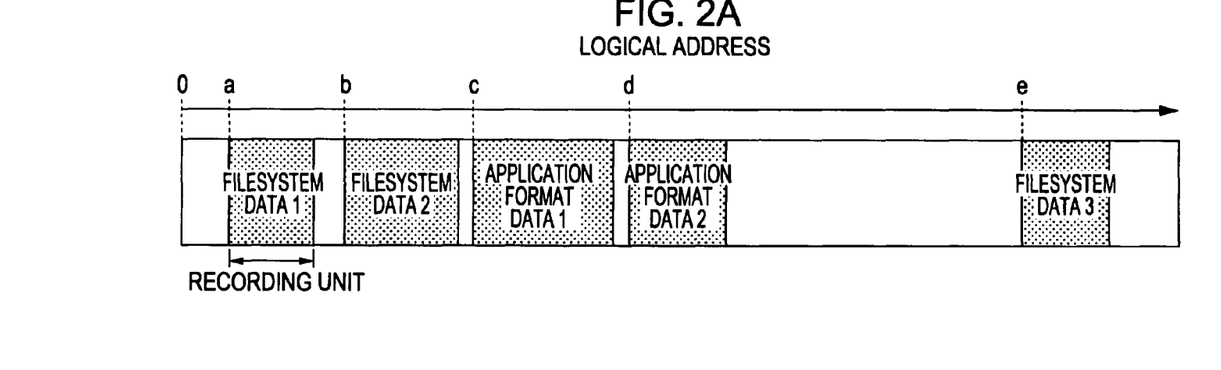
FIGS. 2A and 2B are diagrams for explaining logical-format-image data stored in a storage unit by the information recording apparatus according to the embodiment.

FIG. 2A shows a logical-format image that is recorded on the information recording medium 200 in the end. In the information recording apparatus 100 according to this embodiment, a logical-format image that is to be recorded on the information recording medium 200 is stored in the logical-format-image storage unit 172 as divided into data containing packets 201, as shown in FIG. 2B.

More specifically, the logical-format image is divided into segments each corresponding to a certain recording unit that is determined in accordance with the type of information recording medium (e.g., an ECC block in the case of a DVD) to generate packets containing data segments, and the packets are stored in the logical-format-image storage unit 172 as linked by a list structure. For example, referring to FIGS. 2A and 2B, filesystem data 2 has a size larger than a recording unit (e.g., an ECC block) that is determined in accordance with the type of information recording medium, so that the filesystem data 2 is stored as divided into two packets. Hereinafter, packets containing segments of the logical-format image, constituting data that is to be stored in the logical-format-image storage unit 172, will be referred to as logical-format-image containing packets 201.

Each of the logical-format-image containing packets 201 has header information at least including a logical address that serves as information representing a position for recording on an information recording medium, and pointers to preceding and succeeding logical-format-image containing packets, and the logical-format-image containing packets 201 are linked by a list in ascending order of logical address. List-management information 202 at least includes pointers to data at the beginning and data at the end of the packet data.

The information recording apparatus 100 according to this embodiment intermittently records the logical format image, stored in the logical-format-image storage unit 172 with the packet configuration described above, on an information recording medium.

Figure 3:
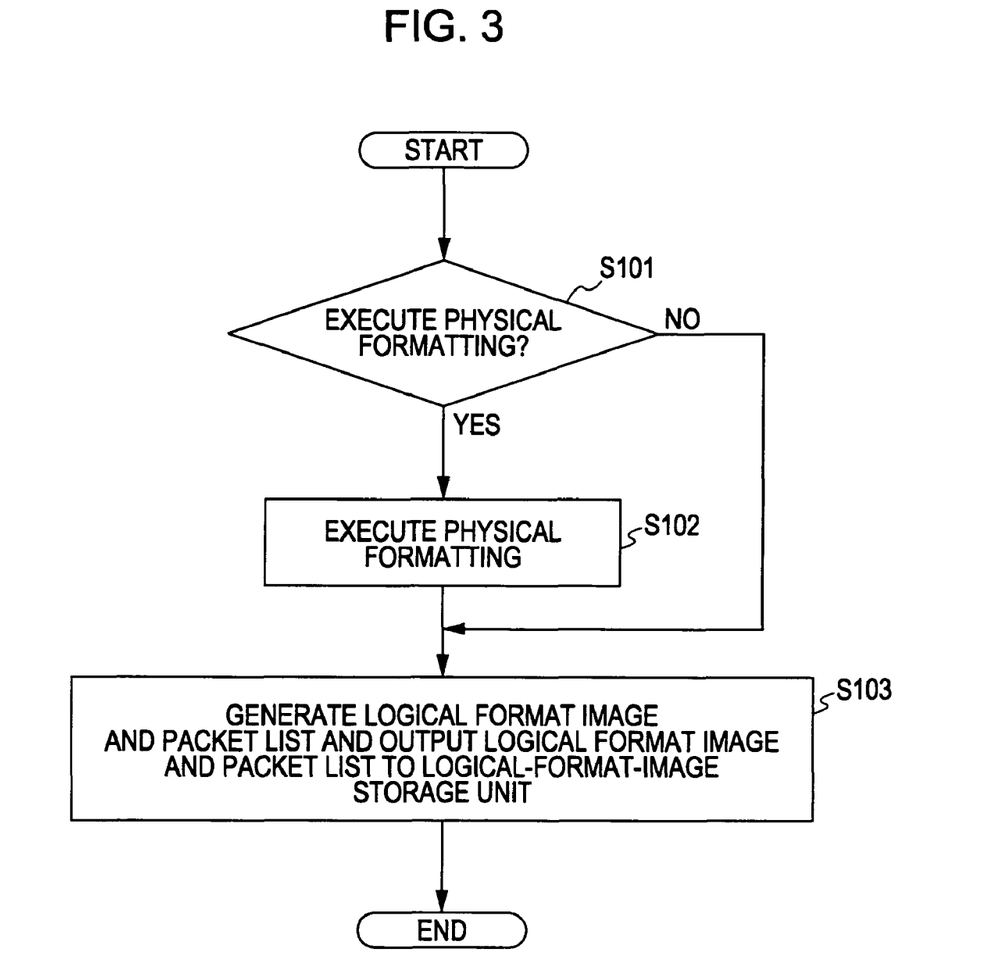
FIG. 3 is a flowchart of a formatting process executed by the information recording apparatus according to the embodiment.

Now, with reference to FIG. 3, a sequence of a process that is executed before recording a logical-format image on an information recording medium, i.e., a sequence of a process up to storing logical-format-image containing packets in the logical-format-image storage unit 172, will be described.

When a formatting request has been input by the user via the input unit of the user interface 111, the formatting request is input to the system controller 113 via the input/output controller 112. When the formatting request has been input to the system controller 113, in step S101, it is checked whether physical formatting of the information recording medium 200 is to be executed.

When it is determined that physical formatting is to be executed, in step S102, the recording controller 121 executes physical formatting of the information recording medium 200 via the drive controller 154. Physical formatting is not needed in some cases, for example, in the case of a recording medium that has already been physically formatted or depending on the type of recording medium. In such cases, physical formatting is skipped.

Then, in step S103, a logical formatting request is issued to the recording controller 121 notifies the application-format manager 152 and the filesystem manager 153. In accordance with an application format or a filesystem format specified by the user, the application-format manager 152 and the filesystem manager 153 construct an initial data image of application-format data and an initial data image of filesystem-format data used for recording data on the information recording medium 200, and output the initial data image of application-format data and the initial data image of filesystem-format data to the logical-format-image manager 171.

As described with reference to FIGS. 2A and 2B, the logical-format-image manager 171 processes the logical-format image into packets of data segments, thereby generating the processed logical-format image composed of the logical-format-image containing packets 201 and the list-management information 202 shown in FIG. 2B, and stores the processed logical-format image in the logical-format-image storage unit 172.

As described above, the information recording apparatus 100 according to this embodiment intermittently records the logical-format image, stored in the logical-format-image storage unit 172 with the packet configuration described above, on an information recording medium. That is, while user data such as video data is being recorded, the logical-format image stored in the logical-format-image storage unit 172 is recorded on an information recording medium intermittently in periods of temporary suspension of recording of the user data on the information recording medium.

When physical formatting is to be executed on the information recording medium 200 as described above, the recording controller 121 exercises control so that input and recording of user data such as video data is allowed upon completion of the physical formatting. When the information recording medium 200 does not require physical formatting, regardless of whether physical formatting is executed, the recording controller 121 exercises control so that input and recording of user data such as video data is allowed when the logical-format-image data has been stored in the logical-format-image storage unit 172 in the form of the packet list described with reference to FIG. 2B. That is, the recording controller 121 exercises control to allow input of user data before starting a process of recording the logical-format-image data on an information recording medium. Thus, the user can immediately start, for example, capturing of video data without waiting for completion of writing of the logical-format-image data on the information recording medium.

Now, sequences of a process of recording user data such as video data on an information recording medium and a process of recording a logical-format image stored in the logical-format-image storage unit 172 on the information recording medium, executed by the information recording apparatus 100 according to this embodiment, will be described.

Figure 4:
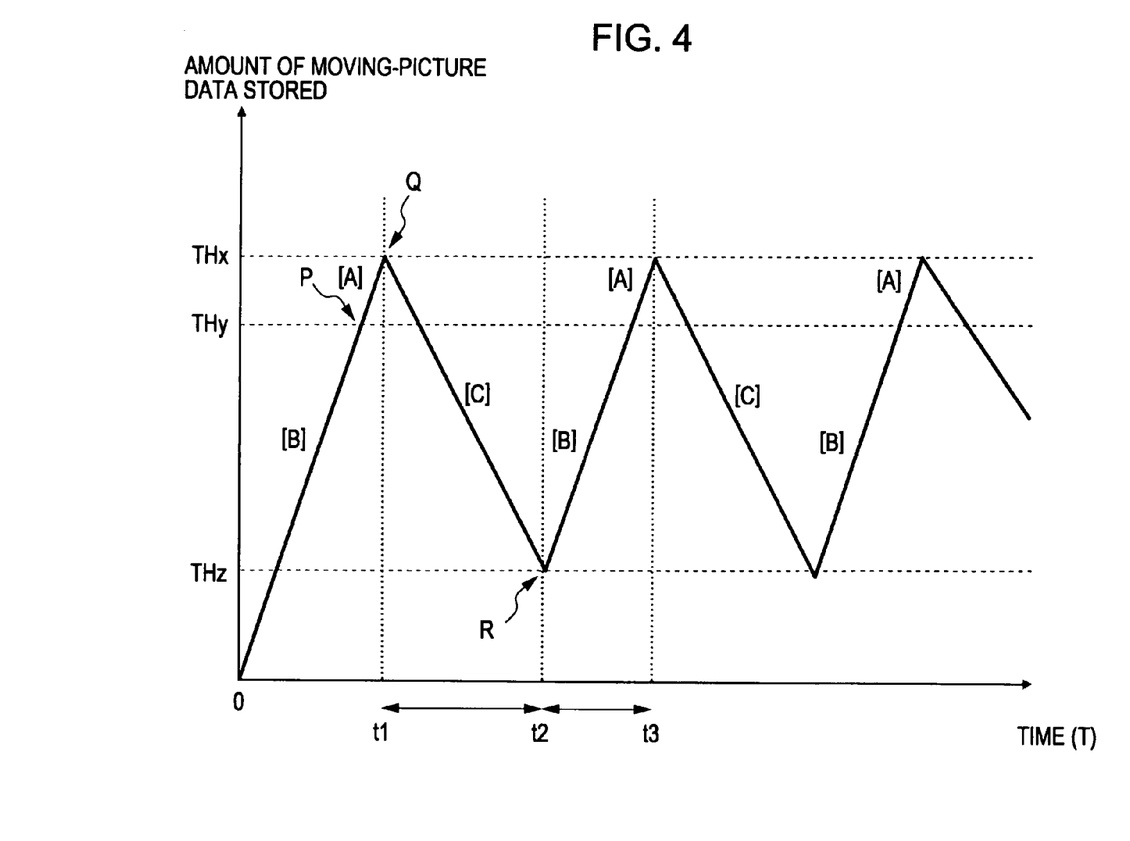
FIG. 4 is a diagram showing transition of the amount of user data stored in a buffer in the information recording apparatus according to the embodiment.

First, with reference to FIG. 4, transition of the amount of user data, such as video data, stored in the buffer 156, and timings of execution of the process of recording user data and the process of recording logical-format data on the information recording medium 200, will be described. FIG. 4 shows a graph in which the horizontal axis represents time and the vertical axis represents the amount of data stored in the buffer 156. For example, when imaging by the user is started at time T=0, user data (video data) is stored in the buffer 156, so that the amount of data stored in the buffer 156 increases.

The buffer-storage-amount manager 151 monitors the amount of data stored in the buffer 156. When the amount of data stored reaches an overflow checking threshold at time T=t1, the recording controller 121 is notified that the amount of data stored has reached the overflow checking threshold. Then, a process of recording the data stored in the buffer 156 on the information recording medium 200 is started.

After the recording of data on the information recording medium 200 is started, the amount of data in the buffer 156 decreases and eventually reaches an underflow checking threshold at time T=t2. When the amount of data in the buffer 156 has reached the underflow checking threshold, the process of recording data on the information recording medium 200 is suspended. During the period of suspension of the recording process, further video data is stored in the buffer 156, so that the amount of data in the buffer 156 increases.

When the amount of data stored reaches the overflow checking threshold at time T=t3, the recording controller 121 is notified that the amount of data stored has reached the overflow checking threshold. Then, a process of recording the data stored in the buffer 156 on the information recording medium 200 is started. As described above, recording of user data on the information recording medium 200 is executed intermittently.

In the information recording apparatus 100 according to this embodiment, the logical-format image stored in the logical-format-image storage unit 172 is recorded on an information recording medium during periods when recording of user data on the information recording medium is not taking place, such as the period of suspension of recording (t2 to t3) shown in FIG. 4.

Figure 5:
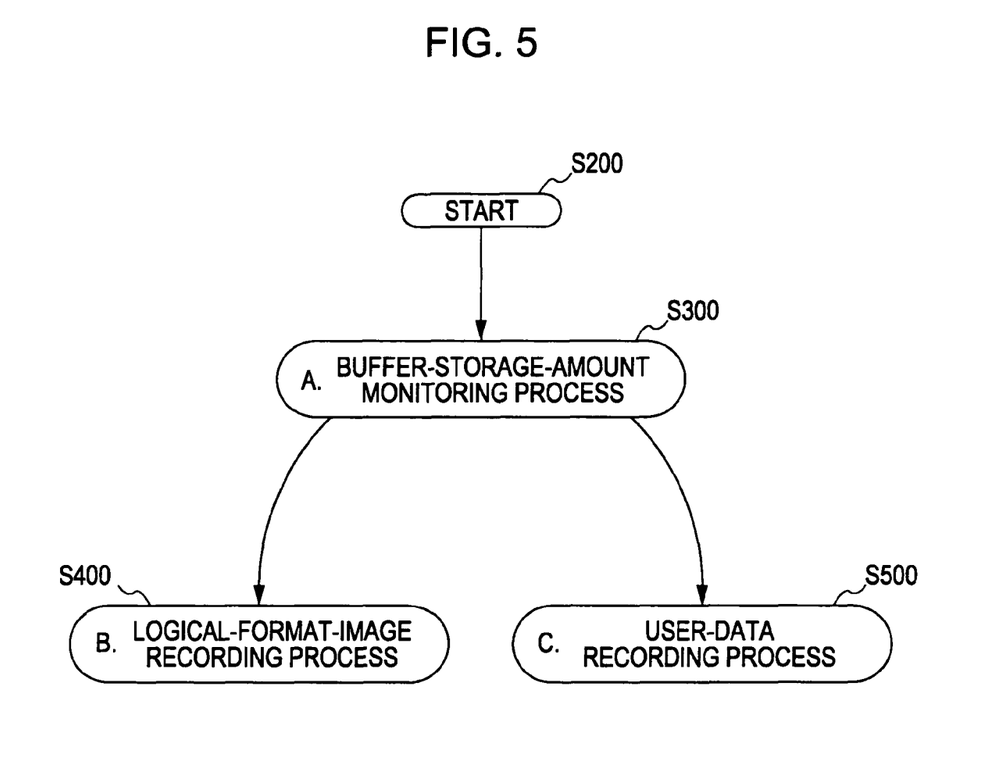
FIG. 5 is a diagram showing an overview of processes executed by the information recording apparatus according to the embodiment.

Now, with reference to FIG. 5 and subsequent figures, sequences of a process of recording user data such as video data on an information recording medium and a process of recording a logical-format image on the information recording medium, executed by the information recording apparatus 100 according to this embodiment, will be described in detail.

First, with reference to FIG. 5, an overview of processes executed by the information recording apparatus 100 according to this embodiment will be described. When a moving-picture recording request has been issued from the user interface 111 to the system controller 113 via the input/output controller 112, first, in step S200, the recording controller 121 starts a process of recording user data such as video data.

When the user-data recording process has been started, data is input from the data input unit 130, and data that has been compressed and multiplexed in the compressor 140 is stored in the buffer 156. At this time, recording of data on the information recording medium 200 is not yet executed. More specifically, when the user-data recording process has been started, first, "A. Buffer-storage-amount monitoring process" in step S300 shown in FIG. 5 is started.

"A. Buffer-storage-amount monitoring process" in step S300 shown in FIG. 5 is executed continuously during execution of processing relating to recording of user data such as video data. That is, the buffer-storage-amount manager 151 continuously monitors the amount of data stored in the buffer 156. On the basis of the amount of data stored in the buffer 156, "B. Logical-format-image recording process" in step S400 or "C. User-data recording process" in step S500 is executed.

"B. Logical-format-image recording process" in step S400 is a process of sequentially obtaining logical-format-image containing packets stored in the logical-format-image storage unit 172 from the beginning of the list and recording the logical-format-image containing packets on the information recording medium 200. "C. User-data recording process" in step S500 is a process of recording user data (video data) stored in the buffer 156 on the information recording medium 200.

In the information recording apparatus 100 according to this embodiment, "B. Logical-format-image recording process" in step S400 or "C. User-data recording process" in step S500 is executed on the basis of the amount of data stored in the buffer 156. Now, specific processing sequences will be described with reference to flowcharts shown in FIGS. 6 to 8.

"A. Buffer-Storage-Amount Monitoring Process"

First, "A. Buffer-storage-amount monitoring process" will be described with reference to a flowchart shown in FIG. 6. "A. Buffer-storage-amount monitoring process" is executed continuously during execution of processing relating to recording of video data.

Figure 6:
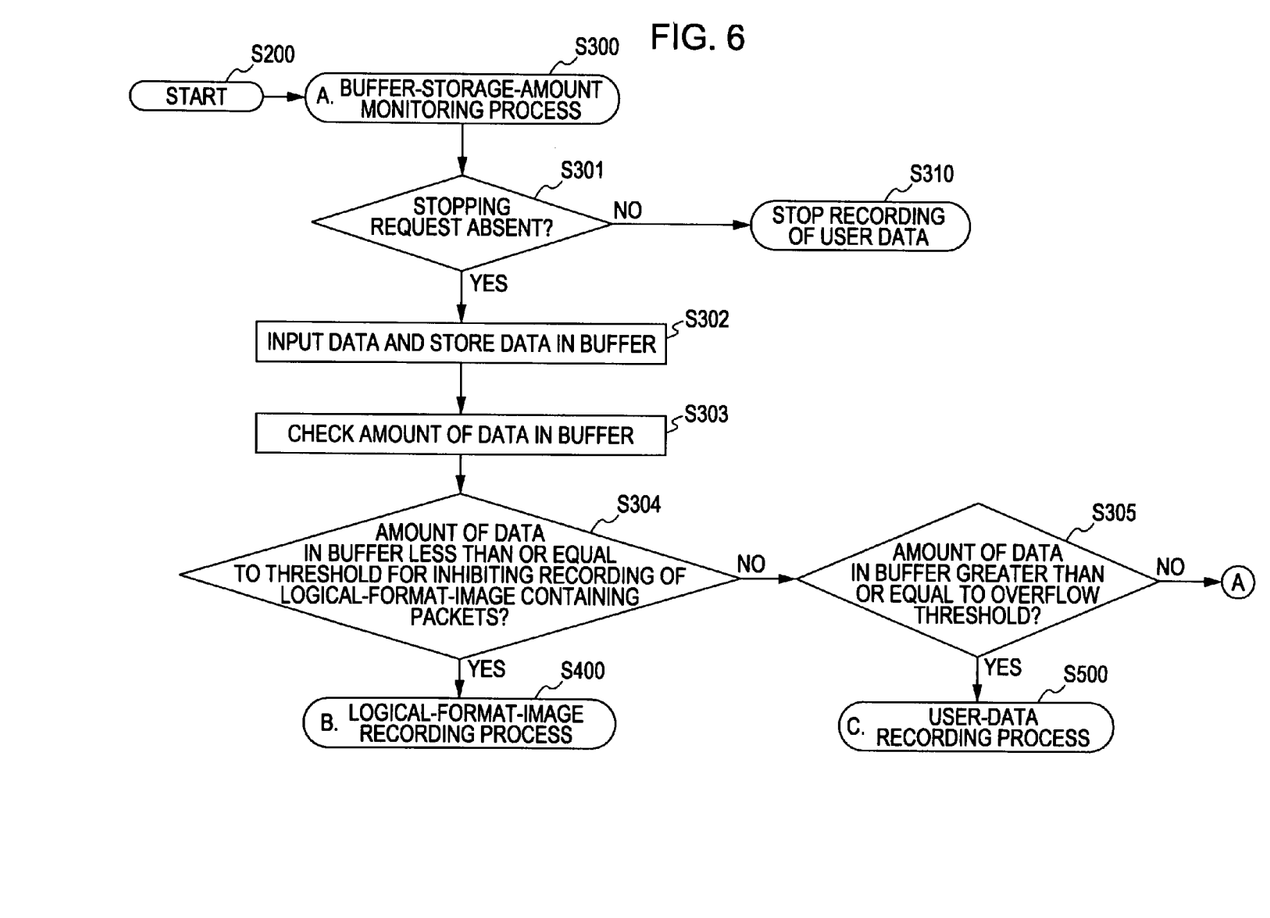
FIG. 6 is a flowchart showing a sequence of a buffer-storage-amount monitoring process executed by the information recording apparatus according to the embodiment.

When a moving-picture recording request is issued from the user interface 111 to the system controller 113 via the input/output controller 112, first, in step S200, the recording controller 121 starts processing relating to recording of video data. In response to the start of the processing in step S200, "A. Buffer-storage-amount monitoring process" in step S300 is started.

When a stop request has been input from the user interface 111 to the system controller 113 via the input/output controller 112 in step S301, the process proceeds to step S310, in which the recording of video data is stopped. When no stop request has been input, in step S302, input video data is written to the buffer 156.

More specifically, the recording controller 121 controls the data input unit 130 and the compressor 140 so that the input moving-picture data and audio data are multiplexed and the multiplexed data is output to the buffer 156 as video data. That is, data is input via the data input unit 130, and data that has been compressed and multiplexed in the compressor 140 is stored in the buffer 156. Then, in step S303, the buffer-storage-amount manager 151 monitors the amount of data stored in the buffer 156.

In step S304, it is checked whether the amount of data stored in the buffer 156, detected by the buffer-storage-amount manager 151, is less than or equal to a threshold THy shown in the graph of FIG. 4. The threshold THy is a threshold for inhibiting recording of logical-format-image containing packets.

When the amount of data stored is less than or equal to the threshold THy for inhibiting recording of logical-format-image containing packets, the process proceeds to step S400 so that "B. Logical-format-image recording process" is executed. That is, a process of recording logical-format-image containing packets stored in the logical-format-image storage unit 172 on the information recording medium 200 sequentially from the beginning of the list is executed.

That is, referring to FIG. 4, after the start of processing relating to recording of user data, "B. Logical-format-image recording process" is executed up to a point P when the amount of data stored in the buffer 156 reaches the threshold THy for inhibiting recording of logical-format-image containing packets.

When it is determined in step S304 that the amount of data stored in the buffer 156, detected by the buffer-storage-amount manager 151, is not less than or equal to the threshold THy for inhibiting recording of logical-format-image containing packets, the process proceeds to step S305. In step S305, it is checked whether the amount of data stored in the buffer 156 is greater than or equal to the overflow checking threshold THx shown in the graph of FIG. 4.

When it is determined in step S305 that the amount of data stored in the buffer 156 is greater than or equal to the overflow checking threshold THx, "C. User-data recording process" in step S500 is executed. Under the control of the recording controller 121, the filesystem manager 153 is queried as to an appropriate position for recording, and the drive controller 154 is controlled to write user data on the information recording medium 200. That is, a process of recording the user data (video data) stored in the buffer 156 on the information recording medium 200 is executed.

As will be understood from the sequence described later in detail, during the execution of "C. User-data recording process", the buffer-storage-amount manager 151 monitors the amount of data stored in the buffer 156, and suspends writing of user data to the information recording medium 200 when the amount of data stored has dropped below the underflow checking threshold THz in the graph shown in FIG. 4.

When it is determined in step S305 that the amount of data stored in the buffer 156 is less than the overflow checking threshold, "A. Buffer-storage-amount monitoring process" in step S300 is executed. More specifically, referring to the graph shown in FIG. 4, when "A. Buffer-storage-amount monitoring process" is executed and the amount of data stored has reached a point Q, it is determined in step S305 that the amount of data stored in the buffer 156 has become greater than or equal to the overflow checking threshold. Then, the process proceeds to "C. User-data recording process" in step S500.

Referring to the graph shown in FIG. 4, in the information recording apparatus 100 according to this embodiment, "B.

Logical-format-image recording process" is executed during the period from time 0 to the point P, "A. Buffer-storage-amount monitoring process" is executed during the period from the point P to the point Q, and "C. User-data recording process" is executed during the period from the point Q to the point R.

These processes are subsequently repeated in a similar pattern. "B. Logical-format-image recording process" is completed at a point when all the logical-format-image containing packets stored in the logical-format-image storage unit 172 have been recorded on the information recording medium 200. Thus, after the completion of "B. Logical-format-image recording process", only the user-data recording process is executed intermittently.

"B. Logical-Format-Image Recording Process"

Next, a specific processing sequence of "B. Logical-format-image recording process" will be described with reference to FIG. 7. As will be understood from the above description, "B. Logical-format-image recording process" is executed during a period from the start of processing relating to recording of user data to a point when the amount of data stored in the buffer 156 reaches the threshold THy for inhibiting recording of logical-format-image containing packets, and during a period from a point when the amount of data stored in the buffer 156 reaches the underflow checking threshold (THz) to a point when the amount of data stored in the buffer 156 reaches the threshold THy for inhibiting recording of logical-format-image containing packets.

Figure 7:
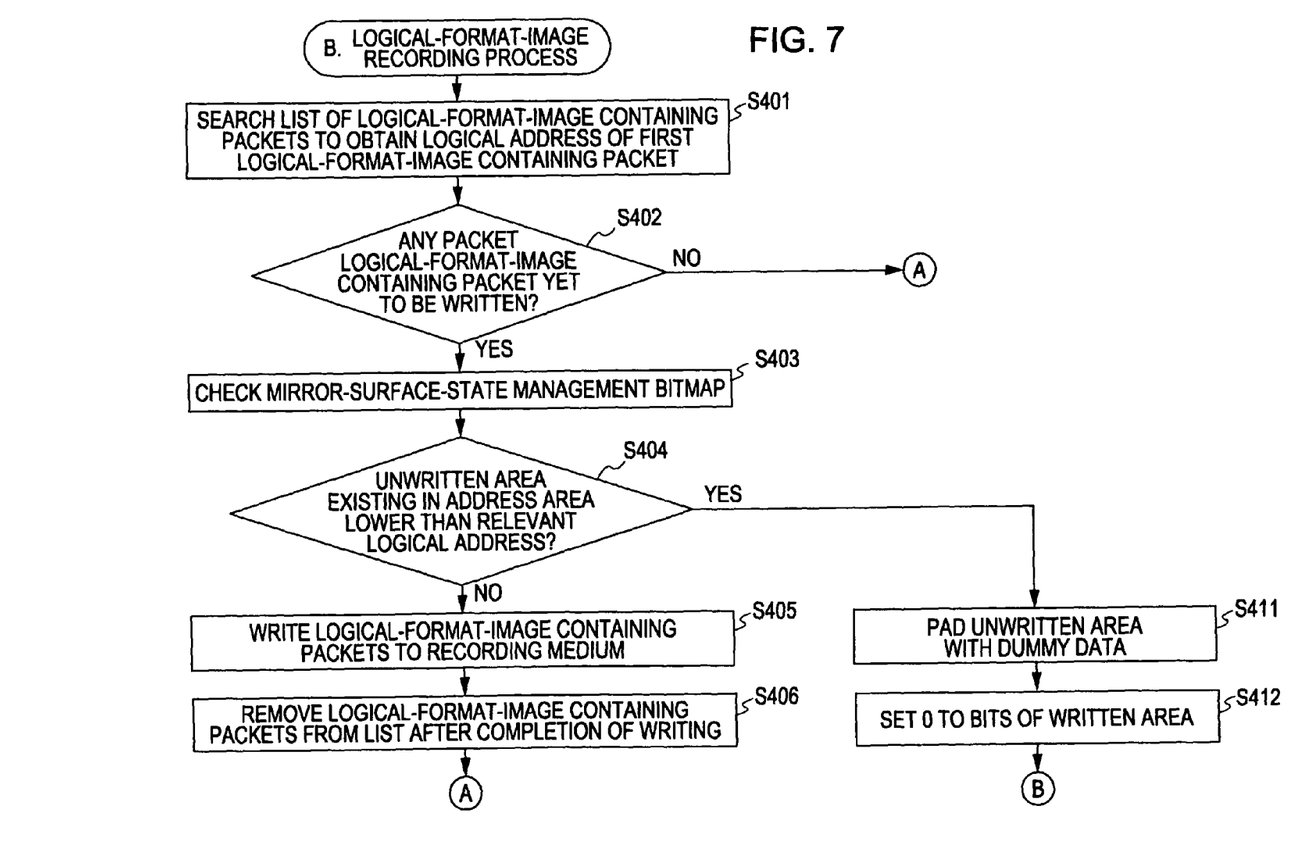
FIG. 7 is a flowchart showing a sequence of a logical-format-image recording process executed by the information recording apparatus according to the embodiment.

As described above, in the information recording apparatus 100 according to this embodiment, logical-format-image containing packets stored in the logical-format-image storage unit 172 are sequentially obtained and written to the information recording medium 200 during periods of suspension of the process of recording user data on the information recording medium 200 while user data is being input to the buffer 156.

More specifically, the logical-format-image manager 171 obtains the logical-format-image containing packets stored in the logical-format-image storage unit 172, i.e., the logical-format-image containing packets 201 described with reference to FIG. 2B, sequentially from the beginning using the list-management information 202, and writes logical-format-image data included in the logical-format-image containing packets to the information recording medium 200.

First, in step S401, the logical-format-image manager 171 searches the list of logical-format-image containing packets to obtain a logical address of a logical-format-image containing packet at the beginning. Then, in step S402, the logical-format-image manager 171 refers to the list-management information 202 to check whether any logical-format-image containing packet remains in the logical-format-image storage unit 172.

When no logical-format-image containing packet remains in the logical-format-image storage unit 172, it is determined that recording of the logical format image on the information recording medium 200 has been completed. Thus, the logical-format-image recording process is exited, and the process proceeds to "A. Buffer-storage-amount monitoring process".

When it is determined in step S402 that a logical-format-image containing packet remains in the logical-format-image storage unit 172, the process proceeds to step S403, in which the mirror-surface-state management bitmap 155 is checked. Note that this step is executed only when the information recording medium 200 is an optical recording medium, such as a DVD.

When the information recording medium 200 is an optical recording medium, such as a DVD, in step S403, the mirror-surface-state management bitmap 155 is referred to. In step S404, it is checked whether any mirror-surface-state area in which data has not yet been recorded remains in a data writing area having a lower address than the logical address of the logical-format-image containing packet that is to be written on the information recording medium 200. When a mirror-surface-state area remains, in step S411, the mirror-surface-state area in which data has not yet been recorded is padded with dummy data. Furthermore, in step S412, a bit value of the mirror-surface-state management bitmap 155, corresponding to the padded area, is set to "1" so that it is possible to recognize that the area is no longer in the mirror-surface state.

Figure 2B:
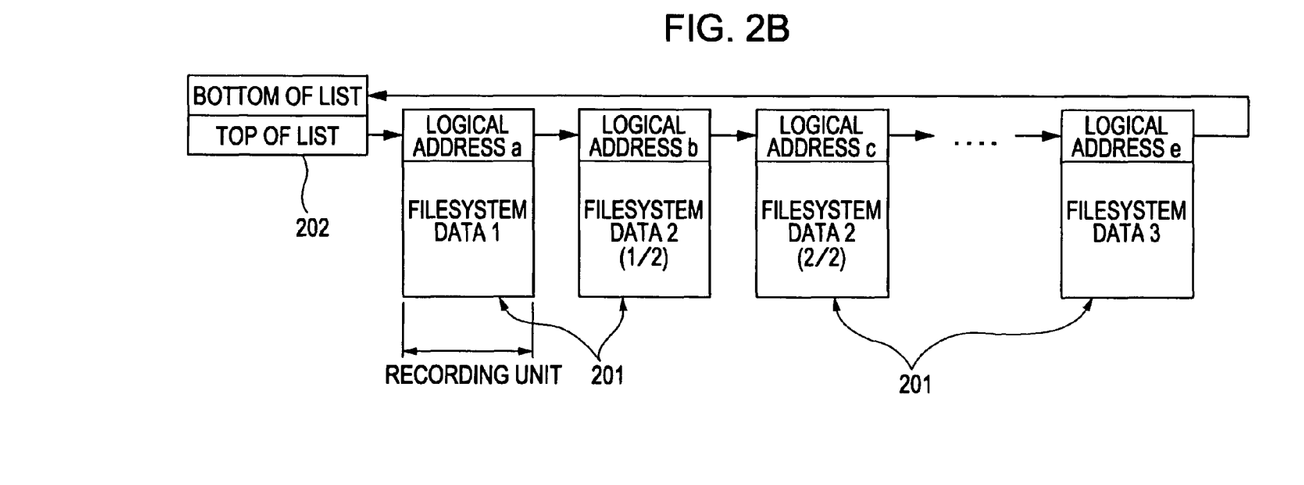

For example, when the logical-format-image containing packets shown in FIG. 2B are stored in the logical-format-image storage unit 172, the logical-format-image containing packet that is written first to the information recording medium 200 is filesystem data 1 having a logical address a. In this case, when an area in which data has not yet been recorded (i.e., having a bit value of "0") exists between the logical address 0 and the logical address a in the mirror-surface-state management bitmap 155, the area is padded with dummy data, and then the filesystem data 1 with the logical address a is recorded on the information recording medium 200.

As described earlier, the checking of an area in which data has not yet been recorded on the information recording medium 200 on the basis of the mirror-surface-state management bitmap 155 and padding with dummy data (S403, S404 (Y), S411, and S412) are executed only when the information recording medium 200 is an optical recording medium, such as a DVD. The series of steps may be executed together at the time of ejection instead of during intermittent recording of video data.

In step S405, the logical-format-image manager 171 obtains the logical-format-image containing packets stored in the logical-format-image storage unit 172, i.e., the logical-format-image containing packets 201 described earlier with reference to FIG. 2B, sequentially from the beginning using the list-management information 202, and writes the logical-format-image containing packets to the information recording medium 200. In step S406, logical-format-image containing packets that have been written to the information recording medium 200 are removed from the list.

Even during the execution of "B. Logical-format-image recording process", "A. Buffer-storage-amount monitoring process" described earlier with reference to FIG. 6 is continuously executed, so that the buffer-storage-amount manager 151 monitors the amount of data stored in the buffer 156. When the amount of data stored has reached the threshold THy for inhibiting recording of logical-format-image containing packets, the buffer-storage-amount manager 151 suspends outputting of subsequent logical-format-image containing packets for recording on the information recording medium 200 in order to prepare for recording of user data stored in the buffer 156.

Then, when the amount of data stored in the buffer 156 has fallen in a range of the underflow checking threshold THz to the threshold THy for inhibiting recording of logical-format-image containing packets, "B. Logical-format-image recording process" is resumed.

Then, the operation described above is repeated until the user instructs end of the recording or all the logical-format-image containing packets have been recorded on the information recording medium 200. After all the logical-format-image containing packets have been output, only intermittent recording of video data is executed.

"C. User-Data Recording Process"

Figure 8:
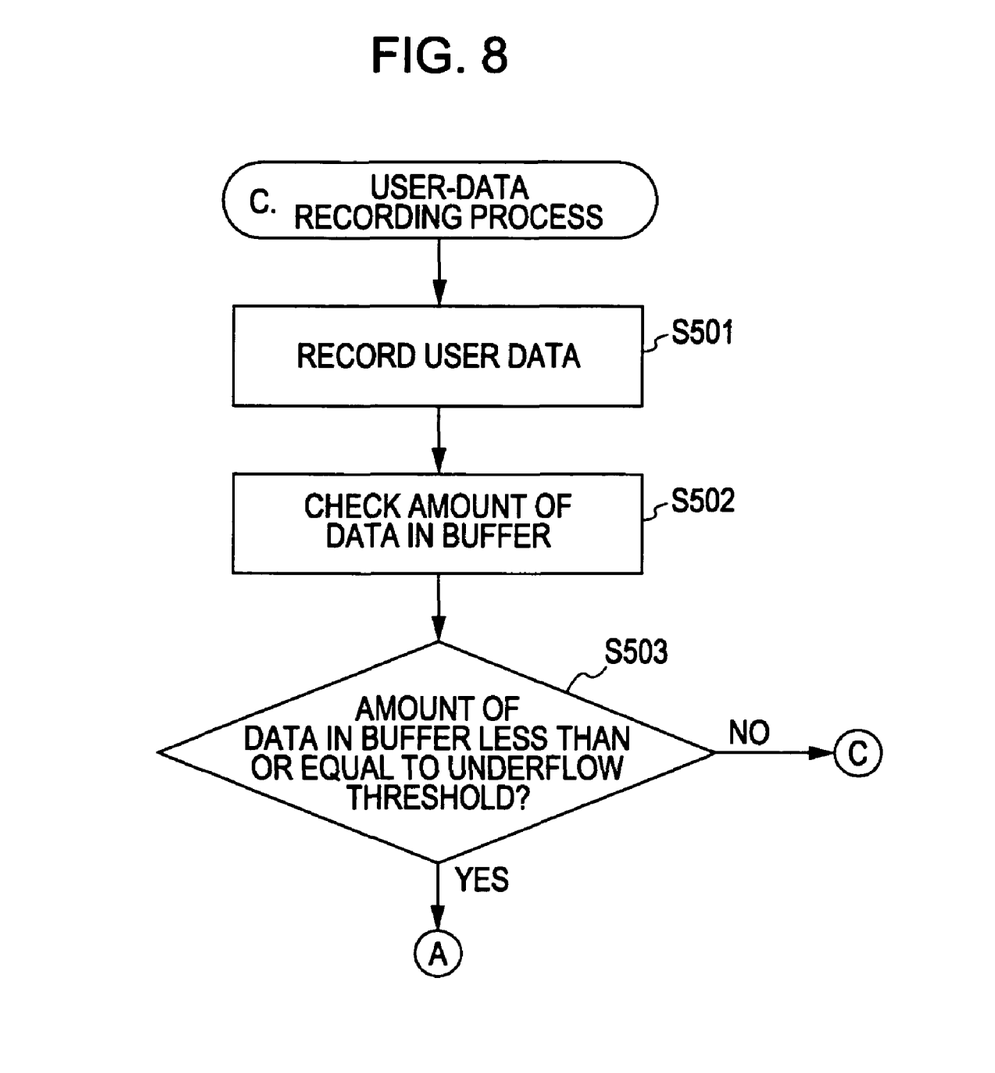
FIG. 8 is a flowchart showing a sequence of a user-data recording process executed by the information recording apparatus according to the embodiment.

Next, a specific sequence of the process of recording user data such as video data will be described with reference to FIG. 8. As will be understood from the foregoing description, "C. User-data recording process" is executed during a period from a point when the amount of data stored in the buffer 156 reaches the overflow checking threshold THx and a point when the amount of data stored in the buffer 156 reaches the underflow checking threshold THz.

In step S501, user data is recorded. More specifically, under the control of the recording controller 121, the filesystem manager 153 is queried as to an appropriate recording position, and the drive controller 154 is controlled to write user data to the information recording medium 200. That is, user data (video data) stored in the buffer 156 is recorded on the information recording medium 200.

In step S502, the buffer-storage-amount manager 151 monitors the amount of data stored in the buffer 156. In step S503, the buffer-storage-amount manager 151 checks whether the amount of data stored has dropped below the underflow checking threshold THz in the graph shown in FIG. 4. While the amount of data stored does not drop below the underflow checking threshold THz, "C. User-data recording process" is continued. When the amount of data stored has dropped below the underflow checking threshold THz, under the control of the recording controller 121, writing of user data to the information recording medium 200 is suspended, and the process proceeds to "A. Buffer-storage-amount monitoring process".

As described above, in the information recording apparatus 100 according to this embodiment, logical-format-image data is written to an information recording medium while user data is being input but recording on the information recording medium is suspended. Thus, without waiting for completion of writing of the logical-format-image data to start recording of user data, for example, it is possible to immediately start imaging by a video camera.

More specifically, in response to a request by a user for formatting a recording medium, the user is notified of completion when physical formatting has been completed, so that the user can start a next operation (e.g., start recording) without waiting for completion of logical formatting. That is, the time for which the user waits for completion of formatting can be reduced. Furthermore, when a recording medium that has once undergone physical formatting undergoes only logical formatting again (e.g., when a DVD+RW medium that has once been used is formatted again), the user does not have to wait for completion of formatting.

Furthermore, the logical-format-image data is written during a period in which user data is being input, e.g., while the user is carrying out imaging. During this period, for example, in the case of a portable device, the device is in a stable statue, and in contrast to a period during movement, the device will not be handled violently, so that data can be written stably to an information recording medium. Thus, the logical-format-image data can also be written stably, so that the possibility of occurrence of a writing error or the like can be reduced.

That is, even when logical formatting has not been completed, the logical-format-image data is not written to the recording medium unless user data is being input for recording. Thus, an error such as an access error does not occur at a timing unexpected by the user.

Now, processing for reference to and updating of logical-format data, finishing of recording of user data, power off, and ejection in the information recording apparatus 100 according to this embodiment will be described.

As described earlier, in the information recording apparatus 100 according to this embodiment, logical-format-image data is written to an information recording medium intermittently instead of at one go. Thus, when the logical-format data is referred to or updated, an error could occur when processing involves logical-format data that has already been recorded on the information recording medium. Also, when finishing of recording of user data, power off, or ejection is executed when writing of logical-format-image data to the information recording medium has not been completed, the logical-format data recorded on the information recording medium could be incomplete data. Thus, when such processing is executed, control is exercised in the following manner.

1. Reference to Logical-Format Data

When logical-format data is referred to in the course of various processes executed by the information recording apparatus 100 shown in FIG. 1, first, the list of logical-format-image containing packets in the logical-format-image storage unit 172 is searched to check whether a logical address relevant to the reference is included. When the logical address is included, the relevant logical-format-image containing packet is referred to. When the logical address is not included, data at the relevant logical address is read directly from the information recording medium 200.

2. Updating of Logical-Format Data

When logical-format data is updated in the course of various processes executed by the information recording apparatus 100 shown in FIG. 1, first, the logical-format-image storage unit 172 is searched to check whether a logical address relevant to the updating is included. When the logical address is included, the relevant logical-format-image containing packet is updated. When the logical address is not included, data at the relevant logical address on the information recording medium 200 is directly updated.

As described above, when logical-format data is referred to or updated, an attempt is made first to obtain a logical-format-image containing packet in the logical-format-image storage unit 172, and the information recording medium 200 is accessed only when the logical-format-image containing packet is not obtained. Thus, logical-format data can be referred to and updated without causing an error.

3. Finishing of Recording of User Data

When the user instructs end of the recording of user data such as video data, the recording of user data is stopped. At this time, if logical-format-image containing packets remain in the logical-format-image storage unit 172, the packets are written to the information recording medium 200 at a next occasion of recording of video data.

4. Power Off and Ejection

When the user requests power off or ejection while logical-format-image containing packets remain in the logical-format-image storage unit 172, before executing power off or ejection, all the logical-format-image containing packets that remain in the logical-format-image storage unit 172 are written to the information recording medium 200. In this case, without monitoring the amount of data stored in the buffer 156, the logical-format-image containing packets are written until the processing is completed. When the information recording medium 200 is an optical recording medium, areas in which data has not yet been written, if any, are padded with dummy data as described earlier.

The present invention has been described above in detail in the context of specific embodiments. However, it should be understood that various modifications of and alternatives to the embodiments can be conceived by those skilled in the art without departing from the spirit of the present invention. That is, the present invention has been disclosed by way of examples, and the present invention should not be construed restrictively. The scope of the present invention should be determined according to the appended claims.

The series of processes described in the specification can be executed by hardware, by software, or by combination of hardware and software. When the processes are executed by software, programs in which the processing sequences are recorded are installed and executed in a memory of a computer embedded in special hardware, or the programs are installed and executed on a general-purpose computer that is capable of executing various processes.

For example, the programs can be recorded in advance on a recording medium such as a hard disc or a read-only memory (ROM). Alternatively, the programs may be temporarily or permanently stored (recorded) on a removable recording medium such as a flexible disc, a compact disc read-only memory (CD-ROM), a magneto-optical (MO) disc, a digital versatile disc (DVD), a magnetic disc, or a semiconductor memory. Such a removable recording medium can be provided in the form of what is called package software.

Instead of installing the programs on a computer from the removable recording medium described above, the programs may be transferred by wireless to a computer from a downloading site or transferred by wire to a computer via a network such as a local area network (LAN) or the Internet, so that the computer can receive the programs transferred and install the programs on an internal recording medium such as a hard disc.

It is to be understood that the various processes described in this specification may be executed in parallel or individually instead of being executed sequentially in the orders described herein, in accordance with the processing ability of an apparatus that executes the processes or other factors as appropriate. In this specification, a system refers to a logical combination of plurality of apparatuses, irrespective of whether the constituent apparatuses are disposed within the same case.

What is claimed is:

1. An information recording apparatus for recording data on an information recording medium, the information recording apparatus comprising:
    logical-format-image managing means for generating logical-format-image data, the logical-format-image data being divided into segments according to a unit of recording determined based on a type of the information recording medium, each segment including a header having a logical address serving as a position for recording on the information recording medium and pointers to preceding and succeeding segments;
    logical-format-image storing means for storing the logical-format-image data generated by the logical-format-image managing means; and
    recording controlling means for exercising control so that the logical-format-image data stored in the logical-format-image storing means is recorded on the information recording medium during periods of suspension of recording of the user data on the information recording medium, the periods of suspension being provided intermittently on the basis of an amount of the user data stored in a buffer for storing the user data.

2. The information recording apparatus according to claim 1, further comprising:
    amount-of-storage managing means for monitoring the amount of the user data stored in the buffer for storing the user data, wherein
    the recording controlling means exercises control so that the user data stored in the buffer is recorded on the information recording medium on condition that the amount of the user data stored in the buffer, monitored by the amount-of-storage managing means, has become greater than or equal to a predetermined overflow checking threshold, and so that the logical-format-image data stored in the logical-format-image storing means is recorded on the information recording medium on condition that the amount of the user data stored in the buffer has become less than or equal to a predetermined underflow checking threshold.

3. The information recording apparatus according to claim 2, wherein
    the recording controlling means exercises control so that recording of the logical-format-image data stored in the logical-format-image storing means on the information recording medium is suspended on condition that the amount of the user data stored in the buffer, monitored by the amount-of-storage managing means, has become greater than or equal to a predetermined threshold for inhibiting recording of logical-format-image packets and less than the overflow checking threshold.

4. The information recording apparatus according to claim 1, wherein
    the logical-format-image managing means generates packets each containing a segment of the logical-format-image data corresponding to a unit of data to be recorded on the information recording medium, and stores the packets in the logical-format-image storing means as a packet list in which the packets are linked by the pointers, and
    wherein the recording controlling means obtains the packets containing the segments of the logical-format-image data stored in the logical-format-image storing means and records the packets on the information recording medium, in an order according to the list.

5. The information recording apparatus according to claim 1, wherein
    the logical-format-image managing means generates the logical-format-image data on the basis of format data of either an application format or a filesystem format or both the application format and the filesystem format.

6. The information recording apparatus according to claim 1, wherein
    the recording controlling means refers to a mirror-surface-state management bitmap provided as information representing areas in which data has not yet been recorded on the information recording medium, and exercises control to pad an area in which data has not yet been recorded and that is to be padded to allow recording of the logical-format-image data on the information recording medium.

7. The information recording apparatus according to claim 1, wherein
    the recording controlling means exercises control so that, when an instruction for power off of the information recording apparatus or for ejection of the information recording medium is input before completion of recording of the logical-format-image data on the information recording medium, the logical-format-image data is recorded on the information recording medium and power off of the information recording apparatus or ejection of the information recording medium is allowed after completion of recording of the logical-format-image data.

8. The information recording apparatus according to claim 1, wherein
the recording controlling means allows input of the user data after completion of physical formatting when the information recording medium requires physical formatting, and allows input of the user data before start of recording of the logical-format-image data on the information recording medium regardless of whether the physical formatting is executed when the information recording medium does not require the physical formatting.

9. An imaging device for recording captured image data on an information recording medium, the imaging device comprising:
a data input unit configured to receive input of user data obtained by imaging;
a buffer configured to store the user data input via the data input unit;
logical-format-image managing means for generating logical-format-image data, the logical-format-image data being divided into segments according to a unit of recording determined based on a type of the information recording medium, each segment including a header having a logical address serving as a position for recording on the information recording medium and pointers to preceding and succeeding segments;
logical-format-image storing means for storing the logical-format-image data generated by the logical-format-image managing means; and
recording controlling means for exercising control so that the logical-format-image data stored in the logical-format-image storing means is recorded on the information recording medium during periods of suspension of recording of the user data on the information recording medium, the periods of suspension being provided intermittently on the basis of an amount of the user data stored in the buffer for storing the user data.

10. An information-recording controlling method of an information recording apparatus for recording data on an information recording medium, the information-recording controlling method comprising:
generating logical-format-image data, the logical-format-image data being divided into segments according to a unit of recording determined based on a type of the information recording medium, each segment including a header having a logical address serving as a position for recording on the information recording medium and pointers to preceding and succeeding segments;
storing the generated logical-format-image data in a logical-format-image storing means; and
exercising control, by a processor of the information recording apparatus, so that the logical-format-image data stored in the logical-format-image storing means is recorded on the information recording medium during periods of suspension of recording of the user data on the information recording medium, the periods of suspension being provided intermittently on the basis of an amount of the user data stored in a buffer for storing the user data.

11. The information-recording controlling method according to claim 10, further comprising:
monitoring the amount of the user data stored in the buffer for storing the user data, wherein
when exercising control, control is exercised so that the user data stored in the buffer is recorded on the information recording medium on condition that the amount of the user data stored in the buffer, detected by the monitoring, has become greater than or equal to a predetermined overflow checking threshold, and so that the logical-format-image data stored in the logical-format-image storing means is recorded on the information recording medium on condition that the amount of the user data stored in the buffer has become less than or equal to a predetermined underflow checking threshold.

12. The information-recording controlling method according to claim 11, wherein
when exercising control, control is exercised so that recording of the logical-format-image data stored in the logical-format-image storing means on the information recording medium is suspended on condition that the amount of the user data stored in the buffer, detected by the monitoring, has become greater than or equal to a predetermined threshold for inhibiting recording of logical-format-image packets and less than the overflow checking threshold.

13. The information-recording controlling method according to claim 10, wherein
generating the logical-format-image data further comprises generating packets each containing a segment of the logical-format-image data corresponding to a unit of data to be recorded on the information recording medium, and storing the packets in the logical-format-image storing means as a packet list in which the packets are linked by the pointers, and
wherein when exercising control, control is exercised to obtain the packets containing the segments of the logical-format-image data stored in the logical-format-image storing means and to record the packets on the information recording medium, in an order according to the list.

14. The information-recording controlling method according to claim 10, wherein
when generating the logical-format-image data, the logical-format-image data is generated on the basis of format data of either an application format or a filesystem format or both the application format and the filesystem format.

15. The information-recording controlling method according to claim 10, further comprising:
referring to a mirror-surface-state management bitmap provided as information representing areas in which data has not yet been recorded on the information recording medium; and
exercising control to pad an area in which data has not yet been recorded and that is to be padded to allow recording of the logical-format-image data on the information recording medium.

16. The information-recording controlling method according to claim 10, further comprising:
exercising control so that, when an instruction for power off of the information recording apparatus or for ejection of the information recording medium is input before completion of recording of the logical-format-image data on the information recording medium, the logical-format-image data is recorded on the information recording medium and power off of the information recording apparatus or ejection of the information recording medium is allowed after completion of recording of the logical-format-image data.

17. The information-recording controlling method according to claim 10, further comprising:
exercising control to allow input of the user data after completion of physical formatting when the information recording medium requires physical formatting, and to allow input of the user data before start of recording of the logical-format-image data on the information recording medium regardless of whether physical formatting is executed when the information recording medium does not require physical formatting.

18. A non-transitory computer-readable storage medium having embedded therein instructions, which when executed by a computer, cause the computer to perform a method of computer program an information recording apparatus to control recording of data on an information recording medium, the method comprising:
generating logical-format-image data, the logical-format-image data being divided into segments according to a unit of recording determined based on a type of the information recording medium, each segment including a header having a logical address serving as a position for recording on the information recording medium and pointers to preceding and succeeding segments;
storing the generated logical-format-image data in logical-format-image storing means; and
exercising control so that the logical-format-image data stored in the logical-format-image storing means is recorded on the information recording medium during periods of suspension of recording of the user data on the information recording medium, the periods of suspension being provided intermittently on the basis of an amount of the user data stored in a buffer for storing the user data.

19. An information recording apparatus for recording data on an information recording medium, the information recording apparatus comprising:
a logical-format-image manager configured to generate logical-format-image data, the logical-format-image data being divided into segments according to a unit of recording determined based on a type of the information recording medium, each segment including a header having a logical address serving as a position for recording on the information recording medium and pointers to preceding and succeeding segments;
a logical-format-image storage unit configured to store the logical-format-image data generated by the logical-format-image manager; and
a recording controller configured to exercise control so that the logical-format-image data stored in the logical-format-image storage unit is recorded on the information recording medium during periods of suspension of recording of the user data on the information recording medium, the periods of suspension being provided intermittently on the basis of an amount of the user data stored in a buffer for storing the user data.

20. An imaging device for recording captured image data on an information recording medium, the imaging device comprising:
a data input unit configured to receive input of user data obtained by imaging;
a buffer configured to store the user data inputted via the data input unit;
a logical-format-image manager configured to generate logical-format-image data, the logical-format-image data being divided into segments according to a unit of recording determined based on a type of the information recording medium, each segment including a header having a logical address serving as a position for recording on the information recording medium and pointers to preceding and succeeding segments;
a logical-format-image storage unit configured to store the logical-format-image data generated by the logical-format-image manager; and
a recording controller configured to exercise control so that the logical-format-image data stored in the logical-format-image storage unit is recorded on the information recording medium during periods of suspension of recording of the user data on the information recording medium, the periods of suspension being provided intermittently on the basis of an amount of the user data stored in the buffer for storing the user data.

* * * * *